(12) United States Patent
Kallappa et al.

(10) Patent No.: US 12,554,998 B2
(45) Date of Patent: Feb. 17, 2026

(54) DATA ANALYTICS FOR MORE-INFORMED REPAIR OF A MECHANICAL OR ELECTROMECHANICAL SYSTEM

(71) Applicant: THE BOEING COMPANY, Chicago, IL (US)

(72) Inventors: Pattada A. Kallappa, Bangalore (IN); Franz D. Betz, Seattle, WA (US); Seema Chopra, Bengaluru (IN); Halasya Siva Subramania, Melbourne (AU); Rashmi Sundareswara, Topanga, CA (US)

(73) Assignee: The Boeing Company, Arlington, VA (US)

( * ) Notice: Subject to any disclaimer, the term of this patent is extended or adjusted under 35 U.S.C. 154(b) by 1117 days.

(21) Appl. No.: 17/337,002

(22) Filed: Jun. 2, 2021

(65) Prior Publication Data

US 2022/0036205 A1    Feb. 3, 2022

Related U.S. Application Data

(60) Provisional application No. 63/059,386, filed on Jul. 31, 2020.

(51) Int. Cl.
*G06N 5/022* (2023.01)
*G05B 23/02* (2006.01)
*G06N 5/04* (2023.01)

(52) U.S. Cl.
CPC ......... *G06N 5/022* (2013.01); *G05B 23/0259* (2013.01); *G06N 5/04* (2013.01)

(58) Field of Classification Search
CPC ....... G06N 5/022; G06N 5/04; G05B 23/0259
See application file for complete search history.

(56) References Cited

U.S. PATENT DOCUMENTS

| | | | | |
|---|---|---|---|---|
| 4,847,795 A | * | 7/1989 | Baker | G06F 11/2257 706/45 |
| 10,712,733 B2 | * | 7/2020 | Nikovski | G06N 5/022 |
| 2004/0225475 A1 | * | 11/2004 | Johnson | G05B 23/0278 702/185 |
| 2007/0067678 A1 | * | 3/2007 | Hosek | G05B 23/0235 714/25 |

(Continued)

*Primary Examiner* — Jennifer N Welch
*Assistant Examiner* — Quoc Ly Phu Phung
(74) *Attorney, Agent, or Firm* — Alleman Hall LLP

(57) ABSTRACT

A method is provided for repair of a mechanical or electromechanical system of a machine. An inference engine receives indication of a failure mode of the system, and measurements of operating conditions of the machine, and the inference engine defines a current problem including (a) the failure mode of the system, and (b) a pattern in the measurements. The inference engine searches a knowledge base with historical problems including (a) failure modes of systems of the machine, and (b) patterns in measurements of the operating conditions, and respective solutions with (c) repair actions performed to address the respective ones of the failure modes, for a respective solution to a historical problem most similar to the current problem. This is inferred as a solution to the current problem, and the inference engine generates an output display indicating the repair action of the solution to address the failure mode of the system.

22 Claims, 4 Drawing Sheets

(56) References Cited

U.S. PATENT DOCUMENTS

| | | | |
|---|---|---|---|
| 2009/0228160 A1* | 9/2009 | Eklund | G06F 11/008 |
| | | | 701/3 |
| 2010/0110594 A1* | 5/2010 | Walters | B60L 15/025 |
| | | | 903/930 |
| 2013/0283104 A1* | 10/2013 | Hosking | G06Q 10/109 |
| | | | 714/E11.179 |
| 2016/0124821 A1* | 5/2016 | Klein | G06F 11/0739 |
| | | | 714/4.4 |
| 2021/0137391 A1* | 5/2021 | Mak | A61B 5/7225 |
| 2021/0342214 A1* | 11/2021 | Madawat | G06F 11/3006 |

* cited by examiner

DATA ANALYTICS FOR MORE-INFORMED REPAIR OF A MECHANICAL OR ELECTROMECHANICAL SYSTEM

CROSS-REFERENCE TO RELATED APPLICATION(S)

This application claims priority to U.S. Provisional Application No. 63/059,386, filed Jul. 31, 2020, entitled DATA ANALYTICS FOR MORE-INFORMED REPAIR OF A MECHANICAL OR ELECTROMECHANICAL SYSTEM, the content of which is incorporated herein by reference in its entirety.

TECHNOLOGICAL FIELD

The present disclosure relates generally to machine repair and, in particular, to repair of a mechanical or electromechanical system of a machine such as an aircraft.

BACKGROUND

Machines including as vehicles such as aircraft, spacecraft, watercraft, motor vehicles, railed vehicles, typically include some type of performance monitoring system that records data regarding the machine performance, which includes the performance of the various systems (and subsystems) of the machine. The data include a record of certain performance events that occur during the operation of the machine. The performance monitoring system typically conducts data collection and reports all of the data collected to the user. The user then may utilize the data in determining the type of maintenance or repair, if any, that the machine may need. For example, if the data indicates that a particular mechanical or electromechanical system of the machine is malfunctioning or that the performance of one or more mechanical or electromechanical systems may contribute to a future machine failure, then the user can perform the appropriate repair on the machine at the next opportunity.

In the case of aircraft in particular, certain events on an aircraft trigger flight deck effects (FDEs). FDEs result when a system (or subsystem) failure, or other fault, causes a problem with the aircraft that may affect airworthiness. FDEs are broadcast to the flight deck of the aircraft to alert the flight crew. Some FDEs require immediate action by the flight crew to remedy the problem, such as returning to the origin airport (this is called an air turn-back) or diverting the flight to a different airport than the original destination (this is called a diversion) so the problem can be fixed. Some FDEs do not affect the current flight on which the FDE occurs, but rather require immediate maintenance or repair at the destination airport. This need for immediate maintenance or repair can therefore cause a delay or a cancellation of the next flight that the aircraft was scheduled to make. Some FDEs do not require in-flight action or immediate maintenance, but rather may merely require maintenance within a few days of the FDE first occurring.

While the current systems for machine performance and fault monitoring provide the necessary data for a user to make an appropriate repair decision, it is still necessary for a user to sort through all of the data to determine the most-appropriate repair action to address a fault mode. Thus, the user must sort and interpret the data in light of the user's knowledge of the particular machine. This can be time consuming and not always result in the first performed repair action being the most appropriate repair action, particularly for complex machines like aircraft and other vehicles. For many types of machines, particularly commercial vehicles, the amount of time the vehicle is out of service is costly to the vehicle owner. As such, the longer it takes for the most-appropriate repair action to be performed for a given fault mode, the longer the vehicle will be out of service, which may be expensive to the vehicle owner if the vehicle would otherwise be in service.

Therefore it would be desirable to have a system and method that takes into account at least some of the issues discussed above, as well as other possible issues.

BRIEF SUMMARY

Example implementations of the present disclosure are directed to machine repair and, in particular, to repair of a mechanical or electromechanical system of a machine such as an aircraft. Example implementations use historical data including failure modes, measurements of operating conditions, and repair actions performed to address the failure modes, to recommend correct repair for a current fault mode of the mechanical or electromechanical system. Example implementations use a knowledge-based system to search a knowledge base for a repair action from the historical data. The knowledge-based system identifies a matching or similar historical failure mode from the current failure mode and current and historical operating conditions, and searches for a repair action for the for current failure mode from the historical repair actions.

Example implementations provide data analytics for more-informed repair of mechanical or electromechanical systems of a machine, enabling mechanics to perform quick and correct repair actions for fault modes of those systems. In the case of aircraft, this may lead to a reduction in time aircraft are out of service, and an increase in on-schedule performance for airlines. In the defense sector, example implementations may lead to increased aircraft availability and increased mission readiness.

The present disclosure thus includes, without limitation, the following example implementations.

Some example implementations provide a method of repair of a mechanical or electromechanical system of a machine, the method comprising executing a knowledge-based system including an inference engine and a knowledge base, the inference engine: receiving indication of a failure mode of the mechanical or electromechanical system that occurred during an operation of the machine, and a time series of measurements of a plurality of operating conditions of the machine recorded during the operation; identifying a pattern in the time series of measurements; defining a current problem including (a) the failure mode of the mechanical or electromechanical system, and (b) the pattern in the time series of measurements; accessing the knowledge base including a set of historical cases describing historical problems and respective solutions, the historical problems including (a) failure modes of systems of the machine that occurred during previous instances of operation of the machine, and (b) patterns in time series of measurements of the plurality of operating conditions of the machine recorded during respective ones of the previous instances of operation, and the respective solutions including (c) repair actions performed to address the respective ones of the failure modes; searching the knowledge base for a historical case describing a respective solution to a historical problem of the historical problems most similar to the current problem, the respective solution inferred as a solution to the current problem, the respective solution to the historical problem and thereby the solution to the current problem including a repair action; and generating an output display indicating the repair action to address the failure mode of the mechanical or electromechanical system.

In some example implementations of the method of any preceding example implementation, or any combination of any preceding example implementations, the machine is a vehicle, the systems include vehicle systems, and the method further comprises: receiving fault data from a vehicle system of the vehicle systems, recorded during the operation that is or includes a trip of the vehicle; and diagnosing the failure mode of the mechanical or electromechanical system that is a failure mode of the vehicle system or another of the vehicle systems, from the fault data.

In some example implementations of the method of any preceding example implementation, or any combination of any preceding example implementations, diagnosing the failure mode further includes diagnosing a timing of the failure mode, and the method further comprises: identifying the plurality of operating conditions as related to the failure mode, the plurality of operating conditions a subset of a greater plurality of operating conditions of the machine, identified from the failure mode; identifying a time interval from the timing of the failure mode; and extracting the time series of measurements from a greater time series of measurements of the greater plurality of operating conditions, and for the time interval.

In some example implementations of the method of any preceding example implementation, or any combination of any preceding example implementations, searching the knowledge base includes searching the knowledge base for the historical case describing the historical problem that includes the failure mode of the current problem, and a pattern of the patterns most similar to the pattern of the current problem.

In some example implementations of the method of any preceding example implementation, or any combination of any preceding example implementations, the repair actions in the knowledge base are weighted based on a success rate of the repair actions to address the respective ones of the failure modes, and wherein two or more of the historical problems of two or more of the historical cases match or are within a defined margin of most similar to the current problem, and searching the knowledge base includes selecting the historical case having a highest weighted repair action and thereby a highest success rate of the repair actions of the two or more of the historical cases.

In some example implementations of the method of any preceding example implementation, or any combination of any preceding example implementations, the machine is an aircraft, and the failure mode of the mechanical or electromechanical system is indicated by a flight deck effect reported by the aircraft during the operation that is or includes a flight of the aircraft.

In some example implementations of the method of any preceding example implementation, or any combination of any preceding example implementations, the repair action references instructions for performing the repair action to address the failure mode.

In some example implementations of the method of any preceding example implementation, or any combination of any preceding example implementations, the method further comprises performing the repair action to address the failure mode of the mechanical or electromechanical system.

Some example implementations provide an apparatus for repair of a mechanical or electromechanical system of a machine, the apparatus comprising: a memory configured to store computer-readable program code for a knowledge-based system including an inference engine and a knowledge base; and processing circuitry configured to access the memory, and execute the computer-readable program code to cause the inference engine and thereby the apparatus to at least perform the method of any preceding example implementation, or any combination of any preceding example implementations.

Some example implementations provide a computer-readable storage medium for repair of a mechanical or electromechanical system of a machine, the computer-readable storage medium being non-transitory and having computer-readable program code for a knowledge-based system stored therein, the knowledge-based system including an inference engine and a knowledge base, the computer-readable program code, in response to execution by processing circuitry, causing the inference engine and thereby an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
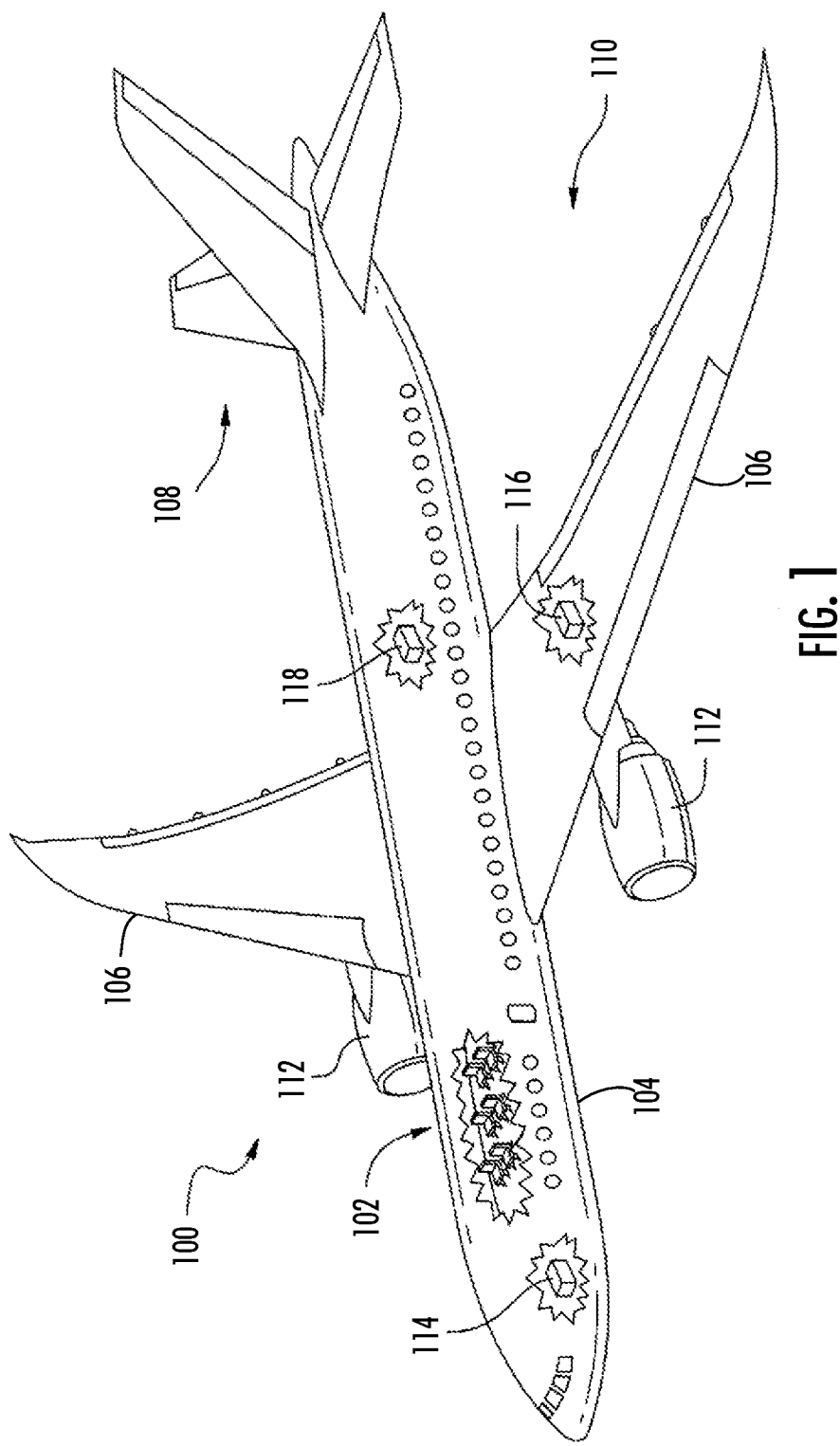
FIG. 1 illustrates an aircraft according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure relate generally machine repair and, in particular, to repair of a mechanical or electromechanical system of a machine. While example implementations will be primarily described in conjunction with repair of a mechanical or electromechanical system of an aircraft, it should be understood that example implementations may be utilized in conjunction with a variety of other machines. Examples of suitable machines that may benefit from example implementations include vehicles such as spacecraft, watercraft, motor vehicles, railed vehicles and the like. Furthermore, it should be understood that unless otherwise specified, the terms "data," "content," "digital content," "information," and similar terms may be at times used interchangeably. Similarly, the terms "maintenance" and "repair" may be at times used interchangeably.

Example implementations of the present disclosure provide data analytics for more-informed repair of mechanical or electromechanical systems, which may lead to most-appropriate, first time repair for fault modes of the respective systems. Some example implementations are premised on many cases in which each fault type is due to one or more root causes from an exhaustive list of root causes. For each specific root cause of a fault mode, operating conditions of a machine may show a fair degree of similarity. The root cause(s) of each fault occurrence may therefore be reflected in operating conditions of the machine (recorded during operation of the machine), including more particularly the operating conditions leading up to and just prior to occurrence of the fault mode.

FIG. 1 illustrates one type of aircraft 100 that may benefit from example implementations of the present disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other embodiments, the propulsion system can include other arrangements, for example, engines carried by other portions of the aircraft including the fuselage and/or the tail. The high-level systems may also include an electrical system 114, hydraulic system 116 and/or environmental system 118. Any number of other systems may be included.

Figure 2:
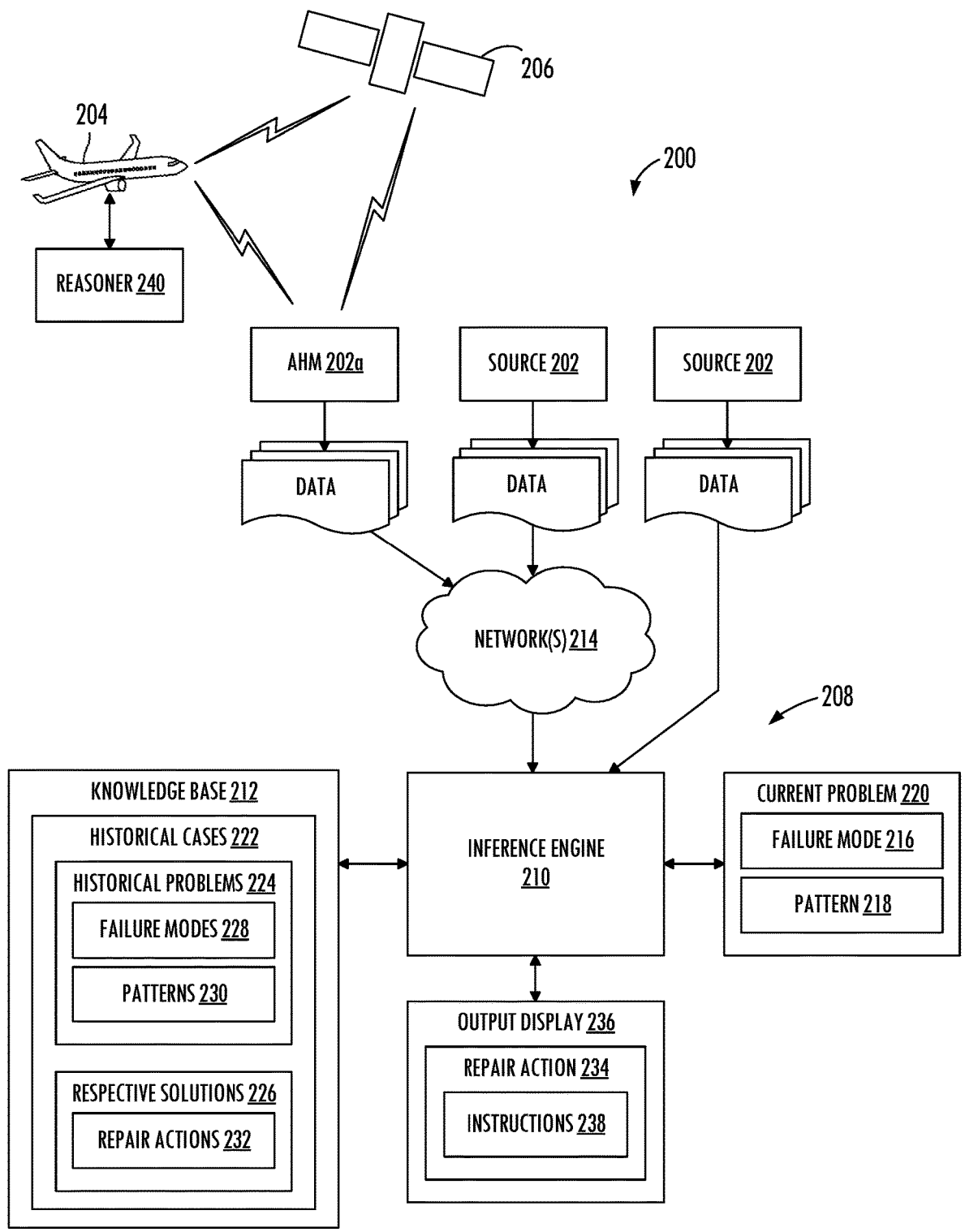
FIG. 2 illustrates a system for repair of a mechanical or electromechanical system of a machine such an aircraft, according to some example implementations.

FIG. 2 illustrates a system 200 for repair of a mechanical or electromechanical system of a machine such an aircraft 100, according to some example implementations. The system may include any of a number of different subsystems (each an individual system) for performing one or more functions or operations. As shown, in some examples, the system includes at least one source 202 of data. In some examples, the source includes a memory that may be located at a single source or distributed across multiple sources. The data may be stored in a number of different manners, such as in a database or flat files of any of a number of different types or formats.

In some examples, the data includes indications of failure modes of systems of the aircraft, some of which may be indicated by flight deck effects (FDEs) reported by the aircraft. One example of a suitable failure mode is failure of the left air conditioning pack of an aircraft. The data also includes flight data for flights of an aircraft, including previous flights of the aircraft. The flight data for each flight of each aircraft of the plurality of aircraft including a time series of measurements of a plurality of operating conditions of the aircraft recorded during the flight from sensors or avionic systems onboard the aircraft. Examples of suitable operating conditions include flow, temperature, pressure, recordings from left and right air conditioning pack, altitude, speed, and the like.

In some more particular examples, the flight data includes the time series of measurements of the plurality of operating conditions recorded during the flight by an aircraft condition monitoring system (ACMS) from the sensors or avionic systems, and least some of the flight data for each flight is accessible from ACMS reports generated by the ACMS. The ACMS is a system onboard an aircraft 204 (e.g., aircraft 100) configured to record flight data and produce ACMS reports, which may be wirelessly transmitted to a particular source 202 of data—shown and at times referred to as an airplane health management (AHM) system 202a—directly or via an artificial satellite 206 or network. In yet other examples, the flight data may be transmitted via by a wired connection or portable data storage device (e.g., flash memory, thumb drive).

The system 200 of example implementations of the present disclosure includes a knowledge-based system 208 to determine a repair action to address a failure mode of a mechanical or electromechanical system of the aircraft 204, from at least some of the above data. The knowledge-based system includes an inference engine 210 and a knowledge base 212. The subsystems including the source(s) 202, AHM system 202a, and knowledge-based system including the inference engine and knowledge base, may be co-located or directly coupled to one another, or in some examples, various ones of the subsystems may communicate with one another across one or more computer networks 214. Further, although shown as part of the system 200, it should be understood that any one or more of the above may function or operate as a separate system without regard to any of the other subsystems. It should also be understood that the system may include one or more additional or alternative subsystems than those shown in FIG. 2.

According to some example implementations of the present disclosure, the inference engine 210 is configured to receive indication of a failure mode 216 of a mechanical or electromechanical system of the aircraft 204, indicated by a flight deck effect reported by the aircraft during a flight of the aircraft. The inference engine is configured to receive a time series of measurements of a plurality of operating conditions of the aircraft recorded during the flight from sensors or avionic systems onboard the aircraft. And the inference engine is configured to identify a pattern 218 in the time series of measurements, and define a current problem 220 including (a) the failure mode of the mechanical or electromechanical system, and (b) the pattern in the time series of measurements.

The inference engine 210 is configured to access the knowledge base 212 including a set of historical cases 222 describing historical problems 224 and respective solutions 226. The historical problems include (a) failure modes 228 of systems of the aircraft that occurred during previous flights of the aircraft. The historical problems also include (b) patterns 230 in time series of measurements of the plurality of operating conditions of the aircraft recorded during respective ones of the previous flights by the airborne flight recorder from the sensors or avionic systems onboard the aircraft. The respective solutions include (c) repair actions 232 performed to address the respective ones of the failure modes. In some examples, these repair actions may be extracted from maintenance logs, such as from an aviation resource management system. One example of a suitable repair action for a left air conditioning pack failure may include: inspected left pack, found high pressure valve stuck, replaced valve.

The inference engine 210 is configured to search the knowledge base 212 for a historical case describing a respective solution (of the respective solutions 226) to a historical problem of the historical problems 224 most similar to the current problem 220. In this regard, the respective solution is inferred as a solution to the current problem. In some examples, this search includes a search of the knowledge base for the historical case describing the historical problem that includes the failure mode 216 of the current problem, and a pattern of the patterns 230 most similar to the pattern 218 of the current problem. The respective solution to the historical problem and thereby the solution to the current problem includes a repair action 234 (of the repair actions 232). The inference engine, then, is configured to generate an output display 236 indicating the repair action to address the failure mode of the mechanical or electromechanical system. In some examples, the repair action references instructions 238 for performing the repair action to address the failure mode.

The knowledge-based system 208 may be built in a number of different manners. In this regard, historical failure modes 228 of systems of the aircraft occurred during previous flights of the aircraft may be collected along with time series of measurements of the plurality of operating conditions of the aircraft recorded during respective ones of the previous flights, and repair actions 232 performed to address the respective ones of the failure modes. This data may be collected for multiple failure modes of multiple systems, over multiple previous flights across one or more years in which information regarding the repair actions performed is available. Data analytics, natural language processing (NLP), machine learning and the like may be performed on the data to develop the inference engine 210 to identify patterns 230 in the time series of measurements, and to identify co-occurring triplets of fault mode, pattern and repair action (F, P, R), which may then be stored in the knowledge base 212.

In some examples, the repair actions 232 in the knowledge base 212 are weighted based on a success rate of the repair actions to address the respective ones of the failure modes 228. When two or more of the historical problems 224 of two or more of the historical cases 222 match or are within a defined margin of most similar to the current problem 220, then, the inference engine 210 may select the historical case having a highest weighted repair action and thereby a highest success rate of the repair actions of the two or more of the historical cases.

In some examples, the system 200 further includes a reasoner 240 configured to receive fault data from an aircraft system, recorded during a flight of the aircraft 204, and diagnose the failure mode 216 of the mechanical or electromechanical system that is a failure mode of the aircraft system or another of the aircraft systems, from the fault data. The reasoned may operate according to an algorithm that in some examples may be developed based on subject matter expert (SME) knowledge and heuristics. As shown, the reasoner is located onboard the aircraft to operate on the fault data in real-time or near real-time. In other examples, the reasoner may be off-board the aircraft and configured to communicate with others of the subsystems across the computer network(s) 214, or the reasoner may be co-located with the knowledge-based system 208. In these examples, the fault data may be downloaded from the aircraft during flight or post flight.

In some further examples, the reasoner 240 is configured to diagnose a timing of the failure mode 216, such as according to an algorithm developed based on SME knowledge and machine learning techniques. In some of these examples, the reasoner is configured to identify the plurality of operating conditions as related to the failure mode. The plurality of operating conditions may be a subset of a greater plurality of operating conditions of the aircraft 204, identified from the failure mode. The reasoner is configured to identify a time interval from the timing of the failure mode, and extract the time series of measurements from a greater time series of measurements of the greater plurality of operating conditions, and for the time interval.

As indicated above, example implementations may be utilized in conjunction with a variety of machines, including vehicles such as spacecraft, watercraft, motor vehicles, railed vehicles and the like. More generally, then, the inference engine 210 is configured to receive indication of a failure mode 216 of a mechanical or electromechanical system of a machine that occurred during an operation of the machine, and a time series of measurements of a plurality of operating conditions of the machine recorded during the operation. The inference engine is configured to identify a pattern 218 in the time series of measurements, and define a current problem 220 including (a) the failure mode of the mechanical or electromechanical system, and (b) the pattern in the time series of measurements.

The inference engine 210 is configured to access the knowledge base 212 including a set of historical cases 222 describing historical problems 224 and respective solutions 226. The historical problems include (a) failure modes 228 of systems of the machine that occurred during previous instances of operation of the machine, and (b) patterns 230 in time series of measurements of the plurality of operating conditions of the machine recorded during respective ones of the previous instances of operation. The respective solutions include (c) repair actions 232 performed to address the respective ones of the failure modes.

The inference engine 210 is configured to search the knowledge base 212 for a historical case describing a respective solution to a historical problem of the historical problems 224 most similar to the current problem 220. The respective solution is inferred as a solution to the current problem, and the respective solution to the historical problem and thereby the solution to the current problem includes a repair action 234. The inference engine is then configured to generate an output display 236 indicating the repair action to address the failure mode of the mechanical or electromechanical system. In some examples, the repair action references instructions 238 for performing the repair action to address the failure mode.

Figure 3:
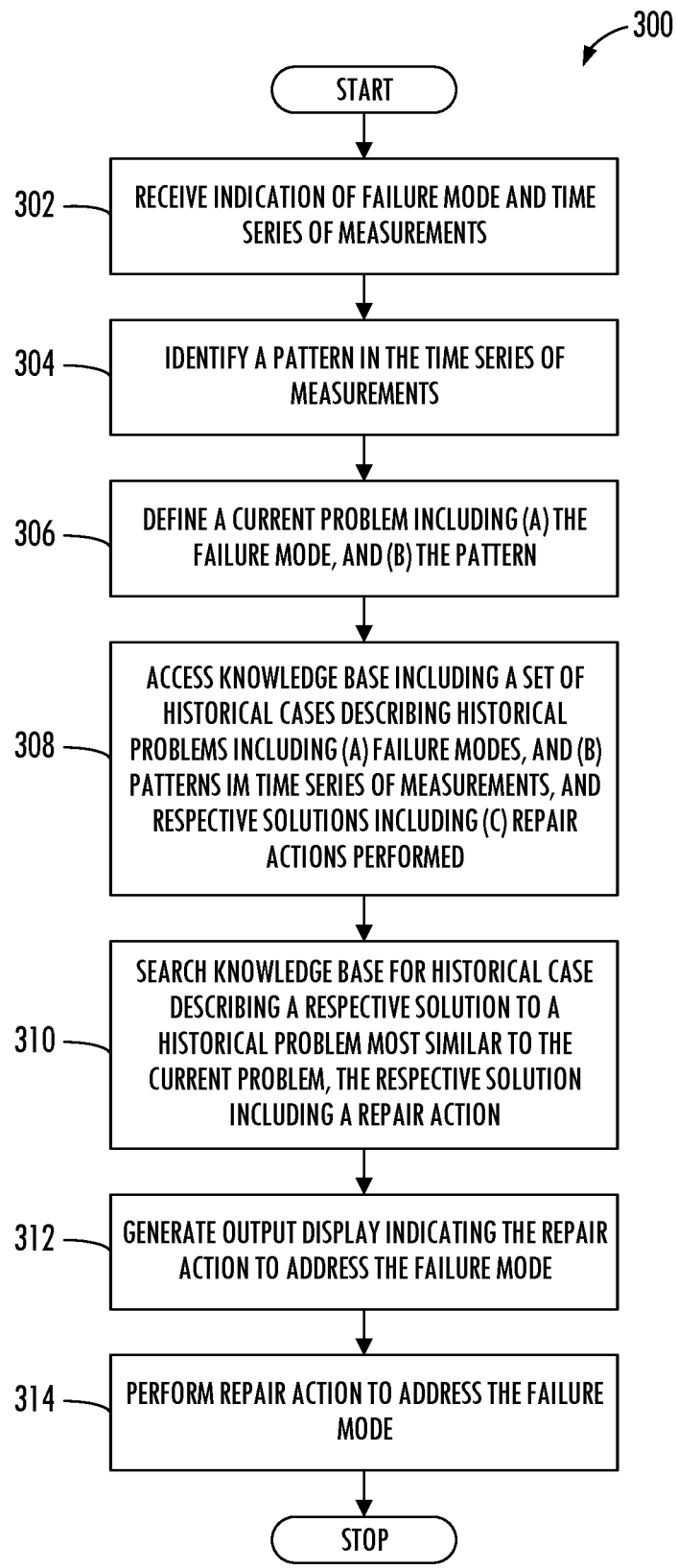
FIG. 3 is a flowchart illustrating various steps in a method of repair of a mechanical or electromechanical system of a machine such as an aircraft, according to example implementations.

FIG. 3 is a flowchart illustrating various steps in a method 300 of repair of a mechanical or electromechanical system of a machine, according to example implementations of the present disclosure. The method includes executing a knowledge-based system 208 including an inference engine 210 and a knowledge base 212. As shown at block 302, the inference engine receives indication of a failure mode 216 of the mechanical or electromechanical system that occurred during an operation of the machine, and a time series of measurements of a plurality of operating conditions of the machine recorded during the operation. The inference engine identifies a pattern 218 in the time series of measurements, and defines a current problem 220 including (a) the failure mode of the mechanical or electromechanical system, and (b) the pattern in the time series of measurements, as shown at blocks 304 and 306.

The inference engine 210 accesses the knowledge base 212 including a set of historical cases 222 describing historical problems 224 and respective solutions 226, as shown at block 308. The historical problems include (a) failure modes 228 of systems of the machine that occurred during previous instances of operation of the machine, and (b) patterns 230 in time series of measurements of the plurality of operating conditions of the machine recorded during respective ones of the previous instances of operation. The respective solutions include (c) repair actions 232 performed to address the respective ones of the failure modes.

The inference engine 210 searches the knowledge base 212 for a historical case describing a respective solution to a historical problem of the historical problems 224 most similar to the current problem 220, as shown at block 310. The respective solution is inferred as a solution to the current problem, and the respective solution to the historical problem and thereby the solution to the current problem includes a repair action 234. The inference engine then generates an output display 236 indicating the repair action to address the failure mode of the mechanical or electromechanical system, as shown at block 312. And in some examples, the method further includes performing the repair action to address the failure mode of the mechanical or electromechanical system, as shown at block 314.

According to example implementations of the present disclosure, the system 200 and its subsystems including the source 202, AHM system 202a, and knowledge-based system 208 including the inference engine 210 and knowledge base 212 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
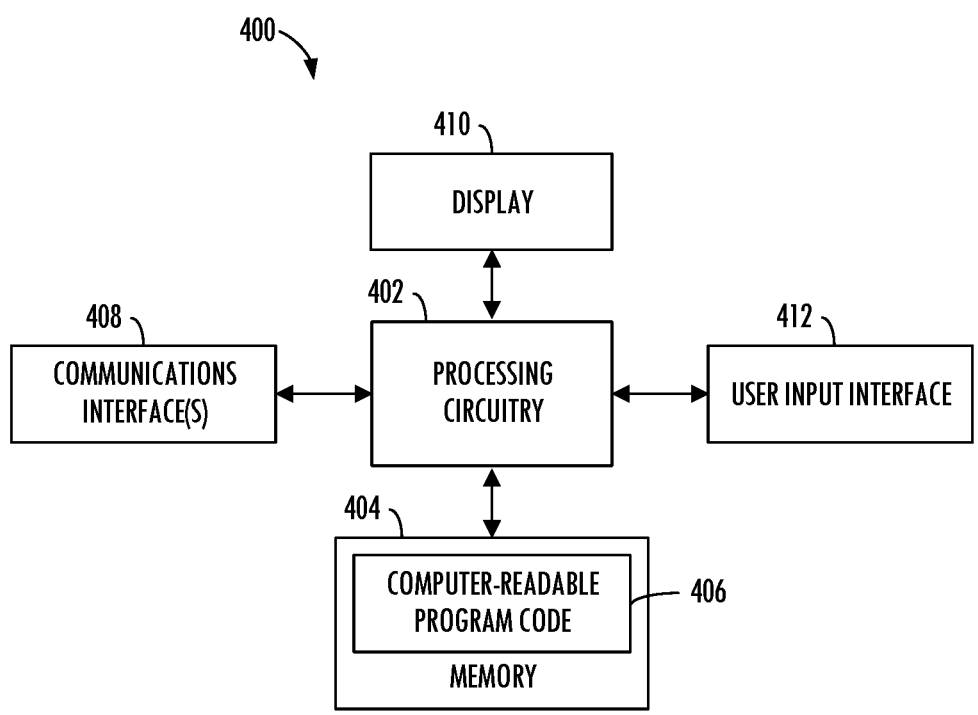
FIG. 4 illustrates an apparatus according to some example implementations.

FIG. 4 illustrates an apparatus 400 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 402 (e.g., processor unit) connected to a memory 404 (e.g., storage device).

The processing circuitry 402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 404 (of the same or another apparatus).

The processing circuitry 402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processing circuitry 402 may also be connected to one or more interfaces for displaying, transmitting and/or receiving information. The interfaces may include a communications interface 408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 may include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, may be implemented by special purpose hardware-based computer systems and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for repair of a mechanical or electromechanical system of a machine, the system comprising:
   a reasoner configured to:
   receive fault data recorded during an operation of the machine;
   receive a time series of measurements of a plurality of operating conditions recorded during the operation of the machine;
   diagnose a failure mode of the mechanical or electromechanical system that occurred during the operation of the machine from the fault data;
   identify a time interval of the failure mode;
   identify a subset of the plurality of operating conditions related to the failure mode; and
   extract a subset of time series of measurements based on the identified subset of the plurality of operating conditions related to the failure mode for the identified time interval; and
   an apparatus comprising:
   a memory configured to store computer-readable program code for a knowledge-based system including an inference engine and a knowledge base; and
   a processing circuitry configured to access the memory, and execute the computer-readable program code to cause the inference engine and thereby the apparatus to at least:
   collect data of previous instances of operation of the machine;
   identify co-occurring triplets of failure modes, patterns, and repair actions using machine learning techniques;
   store, in the knowledge base, the identified co-occurring triplets as a set of historical cases describing historical problems and respective solutions, the historical problems including (a) failure modes of systems of the machine that occurred during previous instances of operation of the machine, and (b) patterns in time series of measurements of the plurality of operating conditions of the machine recorded during respective previous instances of operation, and the respective solutions including (c) repair actions performed to address respective failure mode;
   receive indication of the failure mode and the subset of the time series of measurements;

identify a pattern in the subset of the time series of measurements using a machine learning model;
define a current problem including (a) the failure mode of the mechanical or electromechanical system, and (b) the pattern in the subset of the time series of measurements;
access the knowledge base including the set of historical cases;
search the knowledge base for a historical case describing a respective solution to a historical problem of the historical problems most similar to the current problem, the respective solution inferred as a solution to the current problem, the respective solution to the historical problem and thereby the solution to the current problem including a repair action;
generate an output display indicating the repair action to address the failure mode of the mechanical or electromechanical system; and
perform the repair action to address the failure mode of the mechanical or electromechanical system.

2. The system of claim 1, wherein the machine is a vehicle, the mechanical or electromechanical system includes a vehicle system, and the reasoner is further configured to:
receive the fault data from the vehicle system, recorded during the operation that is or includes a trip of the vehicle; and
diagnose the failure mode of the mechanical or electromechanical system that is a failure mode of the vehicle system, from the fault data.

3. The system of claim 2, wherein the reasoner is further configured to:
identify the time interval of the failure mode using machine learning techniques.

4. The system of claim 1, wherein the apparatus caused to search the knowledge base includes the apparatus caused to search the knowledge base for the historical case describing the historical problem that includes the failure mode of the current problem, and a pattern of the patterns most similar to the pattern of the current problem.

5. The system of claim 1, wherein the repair actions in the knowledge base are weighted based on a success rate of the repair actions to address the respective failure modes, and
wherein two or more of the historical problems of two or more of the historical cases match or are within a defined margin of most similar to the current problem, and the apparatus caused to search the knowledge base includes the apparatus caused to select the historical case having a highest weighted repair action and thereby a highest success rate of the repair actions of the two or more of the historical cases.

6. The system of claim 1, wherein the machine is an aircraft, and the failure mode of the mechanical or electromechanical system is indicated by a flight deck effect reported by the aircraft during the operation that is or includes a flight of the aircraft.

7. The system of claim 1, wherein the repair action references instructions for performing the repair action to address the failure mode.

8. A method of repair of a mechanical or electromechanical system of a machine using a reasoner and a knowledge-based system including an inference engine and a knowledge base, the method comprising:
receiving, using the reasoner, fault data recorded during an operation of the machine;
receiving, using the reasoner, a time series of measurements of a plurality of operating conditions recorded during the operation of the machine;
diagnosing, using the reasoner, a failure mode of the mechanical or electromechanical system that occurred during the operation of the machine from the fault data;
identifying, using the reasoner, a time interval of the failure mode;
identifying, using the reasoner, a subset of the plurality of operating conditions related to the failure mode; and
extracting, using the reasoner, a subset of time series of measurements based on the identified subset of the plurality of operating conditions related to the failure mode for the identified time interval;
collecting, using the inference engine, data of previous instances of operation of the machine;
identifying, using the inference engine, co-occurring triplets of failure modes, patterns, and repair actions using machine learning techniques;
storing, using the inference engine, the identified co-occurring triplets in the knowledge base as a set of historical cases describing historical problems and respective solutions, the historical problems including (a) failure modes of systems of the machine that occurred during previous instances of operation of the machine, and (b) patterns in time series of measurements of the plurality of operating conditions of the machine recorded during respective previous instances of operation, and the respective solutions including (c) repair actions performed to address respective failure mode;
receiving, using the inference engine, indication of the failure mode and the subset of the time series of measurements;
identifying a pattern in the subset of the time series of measurements using a machine learning model;
defining a current problem including (a) the failure mode of the mechanical or electromechanical system, and (b) the pattern in the subset of the time series of measurements;
accessing the knowledge base including the set of historical cases;
searching the knowledge base for a historical case describing a respective solution to a historical problem of the historical problems most similar to the current problem, the respective solution inferred as a solution to the current problem, the respective solution to the historical problem and thereby the solution to the current problem including a repair action;
generating an output display indicating the repair action to address the failure mode of the mechanical or electromechanical system; and
performing the repair action to address the failure mode of the mechanical or electromechanical system.

9. The method of claim 8, wherein the machine is a vehicle, the mechanical or electromechanical system includes a vehicle system, and the method further comprises:
receiving the fault data from the vehicle system, recorded during the operation that is or includes a trip of the vehicle; and
diagnosing the failure mode of the mechanical or electromechanical system that is a failure mode of the vehicle system, from the fault data.

10. The method of claim 9, wherein the method further comprises:

identifying the time interval of the failure mode using machine learning techniques.

11. The method of claim 8, wherein searching the knowledge base includes searching the knowledge base for the historical case describing the historical problem that includes the failure mode of the current problem, and a pattern of the patterns most similar to the pattern of the current problem.

12. The method of claim 8, wherein the repair actions in the knowledge base are weighted based on a success rate of the repair actions to address the respective failure modes, and
wherein two or more of the historical problems of two or more of the historical cases match or are within a defined margin of most similar to the current problem, and searching the knowledge base includes selecting the historical case having a highest weighted repair action and thereby a highest success rate of the repair actions of the two or more of the historical cases.

13. The method of claim 8, wherein the machine is an aircraft, and the failure mode of the mechanical or electromechanical system is indicated by a flight deck effect reported by the aircraft during the operation that is or includes a flight of the aircraft.

14. The method of claim 8, wherein the repair action references instructions for performing the repair action to address the failure mode.

15. The method of claim 8, wherein the repair action is performed on the mechanical or electromechanical system of an aircraft.

16. A computer-readable storage medium for repair of a mechanical or electromechanical system of a machine, the computer-readable storage medium being non-transitory and having computer-readable program code for a reasoner and a knowledge-based system stored therein, the knowledge-based system including an inference engine and a knowledge base, the computer-readable program code, in response to execution by processing circuitry, causing an apparatus to at least:
receive, using the reasoner, fault data recorded during an operation of the machine;
receive, using the reasoner, a time series of measurements of a plurality of operating conditions recorded during the operation of the machine;
diagnose, using the reasoner, a failure mode of the mechanical or electromechanical system that occurred during the operation of the machine from the fault data;
identify, using the reasoner, a time interval of the failure mode;
identify, using the reasoner, a subset of the plurality of operating conditions related to the failure mode; and
extract, using the reasoner, a subset of time series of measurements based on the identified subset of the plurality of operating conditions related to the failure mode for the identified time interval;
collect, using the inference engine, data of previous instances of operation of the machine;
identify, using the inference engine, co-occurring triplets of failure modes, patterns, and repair actions using machine learning techniques;
store, using the inference engine, the identified co-occurring triplets in the knowledge base as a set of historical cases describing historical problems and respective solutions, the historical problems including (a) failure modes of systems of the machine that occurred during previous instances of operation of the machine, and (b) patterns in time series of measurements of the plurality of operating conditions of the machine recorded during respective previous instances of operation, and the respective solutions including (c) repair actions performed to address respective failure mode;
receive, using the inference engine, indication of the failure mode and the subset of the time series of measurements;
identify a pattern in the subset of the time series of measurements using a machine learning model;
define a current problem including (a) the failure mode of the mechanical or electromechanical system, and (b) the pattern in the subset of the time series of measurements;
access the knowledge base including the set of historical cases;
search the knowledge base for a historical case describing a respective solution to a historical problem of the historical problems most similar to the current problem, the respective solution inferred as a solution to the current problem, the respective solution to the historical problem and thereby the solution to the current problem including a repair action;
generate an output display indicating the repair action to address the failure mode of the mechanical or electromechanical system; and
perform the repair action to address the failure mode of the mechanical or electromechanical system.

17. The computer-readable storage medium of claim 16, wherein the machine is a vehicle, the mechanical or electromechanical system includes a vehicle system, and the computer-readable storage medium has further computer-readable program code stored therein that, in response to execution by the processing circuitry, causes the apparatus to further at least:
receive the fault data from the vehicle system, recorded during the operation that is or includes a trip of the vehicle; and
diagnose the failure mode of the mechanical or electromechanical system that is a failure mode of the vehicle system, from the fault data.

18. The computer-readable storage medium of claim 17, wherein the apparatus caused to diagnose the failure mode further includes the apparatus caused to diagnose a timing of the failure mode, and the computer-readable storage medium has further computer-readable program code stored therein that, in response to execution by the processing circuitry, causes the apparatus to further at least:
identify the time interval of the failure mode using machine learning techniques.

19. The computer-readable storage medium of claim 16, wherein the apparatus caused to search the knowledge base includes the apparatus caused to search the knowledge base for the historical case describing the historical problem that includes the failure mode of the current problem, and a pattern of the patterns most similar to the pattern of the current problem.

20. The computer-readable storage medium of claim 16, wherein the repair actions in the knowledge base are weighted based on a success rate of the repair actions to address the respective failure modes, and
wherein two or more of the historical problems of two or more of the historical cases match or are within a defined margin of most similar to the current problem, and the apparatus caused to search the knowledge base includes the apparatus caused to select the historical case having a highest weighted repair action and thereby a highest success rate of the repair actions of the two or more of the historical cases.

21. The computer-readable storage medium of claim 16, wherein the machine is an aircraft, and the failure mode of the mechanical or electromechanical system is indicated by a flight deck effect reported by the aircraft during the operation that is or includes a flight of the aircraft.

22. The computer-readable storage medium of claim 16, wherein the repair action references instructions for performing the repair action to address the failure mode.

* * * * *